July 10, 1951 E. E. MASTERSON 2,560,234

MASS PRODUCTION METHOD OF, AND APPARATUS FOR, MAKING REELABLE MAGNETIC PHONOGRAPH RECORDS

Filed Feb. 26, 1949 2 Sheets-Sheet 1

INVENTOR
EARL E. MASTERSON
BY Morris A. Rabkin
ATTORNEY

July 10, 1951 — E. E. MASTERSON — 2,560,234

MASS PRODUCTION METHOD OF, AND APPARATUS FOR, MAKING REELABLE MAGNETIC PHONOGRAPH RECORDS

Filed Feb. 26, 1949 — 2 Sheets-Sheet 2

INVENTOR
EARL E. MASTERSON
BY Morris A. Rabkin
ATTORNEY

Patented July 10, 1951 2,560,234

UNITED STATES PATENT OFFICE 2,560,234

MASS PRODUCTION METHOD OF, AND APPARATUS FOR, MAKING REELABLE MAGNETIC PHONOGRAPH RECORDS

Earl E. Masterson, Palmyra, N. J., assignor to Radio Corporation of America, a corporation of Delaware Application February 26, 1949, Serial No. 78,522

5 Claims. (Cl. 179—100.2)

It is known that the quality of a magnetic recording is a function of the speed of the tape (or wire) during the recording interval; i. e., the higher the tape-speed the higher the quality of the recording upon that record. Practical considerations impose an upper limit on tape-speed and on the size of the reels which can be used in a conventional magnetic-phonograph. Seven inches is now the standard diameter of the reels used in so-called "home instruments" and seven and one-half inches per second is the standard speed for the "paper-tape" records used in such instruments. It has been found, however, that if the master records (from which the duplicate records of commerce are made) are recorded at this standard speed, the "high-fidelity" of the master record may be lost in re-recording its magnetic trace upon the duplicate record-blanks.

Accordingly, an object of the present invention is to provide an improved mass-production method of making magnetic-phonograph records of high fidelity.

This first-mentioned object is achieved in accordance with the method of the invention by applying the sound, originally, to a magnetizable record blank in the form of a magnetic trace while running said blank at a speed several times that of the normal playing speed of the duplicate records which are to be made from this original or "master" recording. In the re-recording process of the invention the master-record is driven at the same high speed at which it was recorded and the energy which is picked-up by a sound-head in contact with the magnetized surface of the master is applied simultaneously to a multiplicity of reelable magnetizable record blanks of "standard" length while running said blanks at the lower or "normal" speed of the phonograph in which they are designed to be played.

Another serious problem encountered in the mass production of reelable magnetic phonograph-records is that of maintaining a constant speed-ratio between the "master" and "duplicate" records during the re-recording interval. To this end it has previously been proposed (see Stille, 1,811,817) to mount the take-up reels for all of the record blanks upon the same shaft as the take-up reel for the master record. The trouble with this procedure is that minor irregularities in the thickness dimension of the record-tape (or in the gauge of a wire record) may cause the record material to pile up unevenly on the reels and thus to produce variations in the relative speeds of the records due to unequal variations in the effective diameters of the several reels.

If but a single ("one generation") re-recording is involved, minor variations in the speed of the master and duplicate records might not seriously impair the quality of the second recording, but if magnetic recordings are to be produced in commercially saleable quantities, not one re-recording, but several re-recordings are usually necessary to produce the final record for sale to the public. Ordinarily, four generations of re-recording are required to save the "original master" from unnecessary use, and to supply the required number of "duplicate master" records for use in the factory. Thus, if ordinary production techniques are employed, the "wows" resulting from variations in the speed of as many as eight machines might be manifest in the sound on the final tape.

Accordingly, another object of the present invention is to provide an improved "constant speed" method of, and apparatus for, applying to a reelable record-blank a duplicate of the magnetic tracing upon a master record, whereby the tracing upon the blank shall be substantially free from "wows" and other acoustically noticeable disturbances of the type commonly attributed to variations in the relative speed of the master and duplicate blanks during the re-recording interval.

This second-mentioned object is achieved in accordance with the invention by applying the forces required to drive the master record (or records) and the record-blank (or blanks) to corresponding points or areas adjacent to the magnetic transducers or sound-heads which serve said record mediums.

Another and related object of the present invention is to provide a re-recording apparatus capable of handling master-records which have been recorded, in the interests of high-fidelity, at a speed higher than the normal play-back speed of the records which are to be re-recorded therefrom.

This object is achieved in accordance with the invention by deriving the reeling forces required to drive the master and duplicate records at said different speeds from driving elements of different diameters mounted upon a common capstan.

Still another object of the invention is to provide an improved re-recording machine for reelable magnetic records, and one wherein the record blanks may be prepared for their run between storage and take-up reels prior to inserting the blanks within the machine, whereby the operator may be engaged in making ready a new lot of record blanks during the run of a first lot through the machine.

This object is acheived in accordance with the invention by mounting all of the driven elements of the reeling system for each record, and record blank, upon a separate removable shelf or tray and by mounting the driving elements for each of the said reeling systems in the machine per se, in a position to engage the driven elements when the shelves are inserted within the machine.

Another and fifth object of the present invention is to provide a method of, and apparatus for, re-recording a plurality of master recordings simultaneously upon a dual-track magnetic record blank (or upon a multiplicity of such blanks), said method and apparatus being applicable to the manufacture of dual-track records of the type wherein the sound-tracks or "magnetic traces" extend in opposite directions along the record.

This last mentioned object is achieved in accordance with the present invention by deriving the sound, which is to be recorded, from two discrete reelable master-records wound in opposite directions upon separate reels, and by running said oppositely wound masters simultaneously in a common direction while picking-up the sound from said records and applying it simultaneously in the form of separate magnetic traces to a record-blank running in the same direction.

Certain preferred details of construction, together with other objects and advantages, will be apparent and the invention itself will be best understood upon reference to the following specification and to the accompanying two sheets of drawing, wherein.

Figure 1:
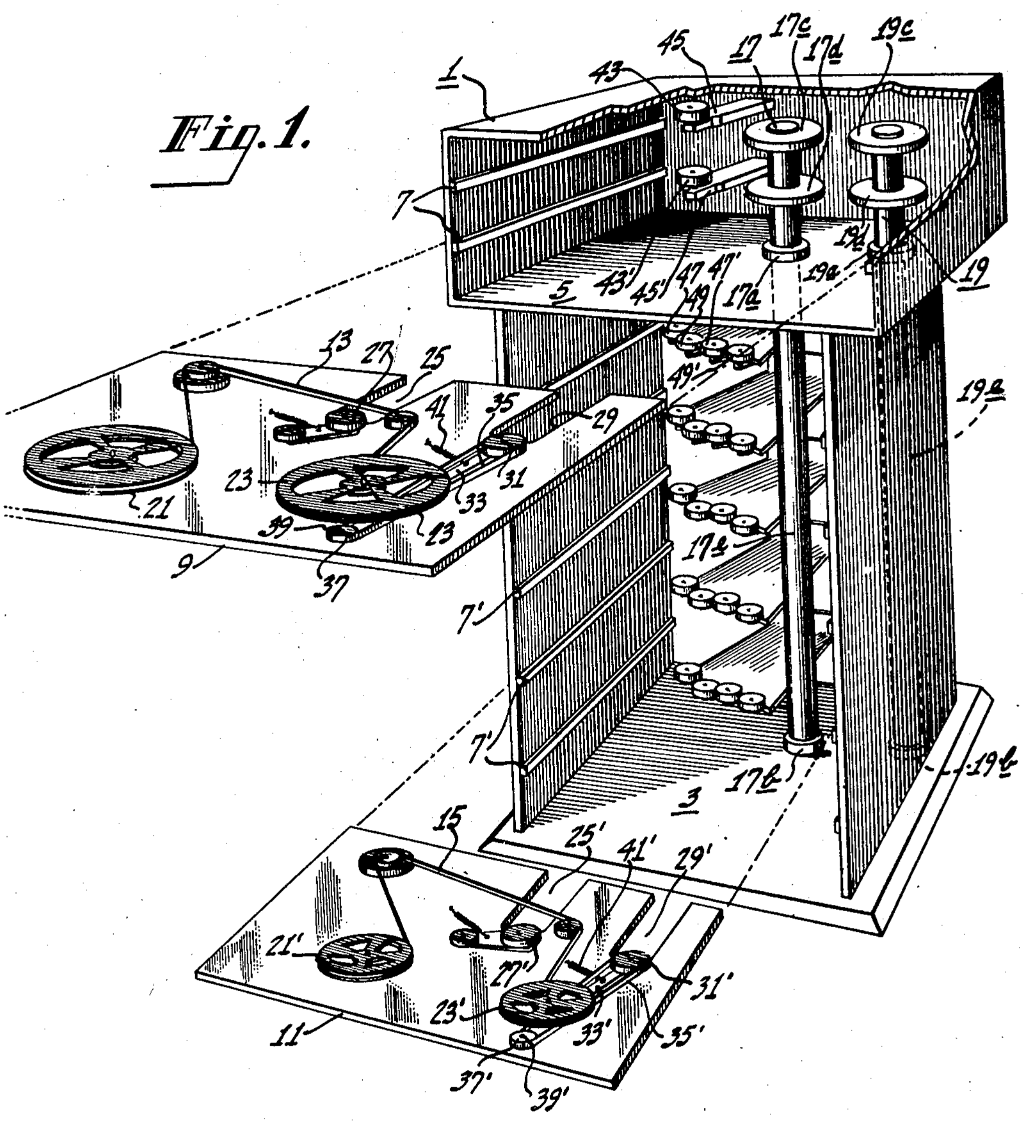
Figure 1 is an exploded view of a machine for the re-recording of reelable magnetic records, the driven parts of the reeling system for the master record and of the recording blanks being mounted on removable shelves and the sound-heads and driving elements of the system being mounted within the machine, all in accordance with the principle of the invention.
Figure 2:
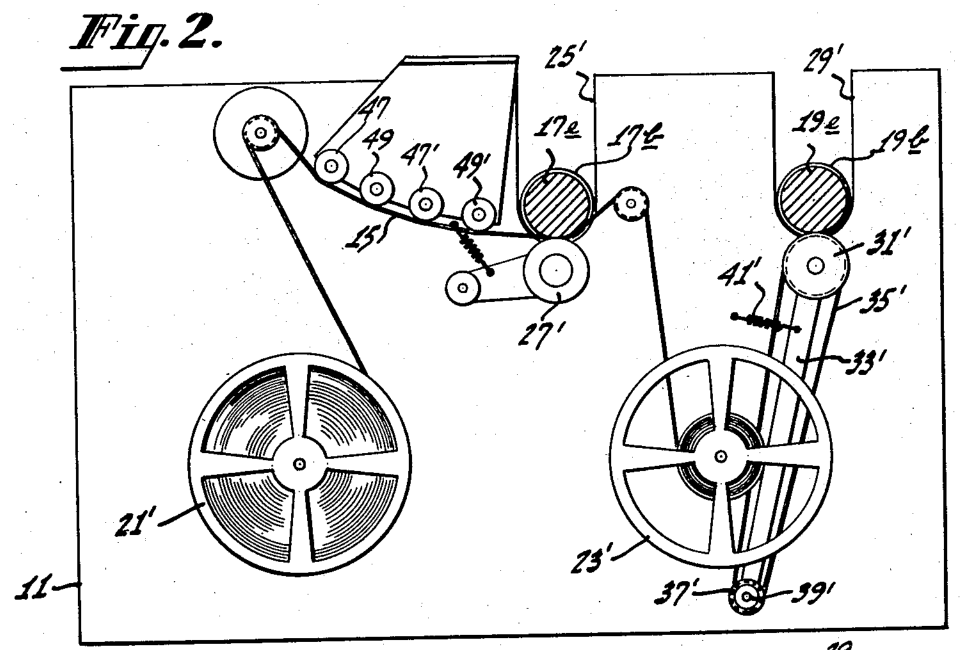
Figure 2 is a plan view of a shelf-mounted reeling system for a dual-track recording blank, with the tray in its operating position within the machine of Fig. 1 and showing the sound-heads for recording and monitoring each sound-track.
Figure 3:
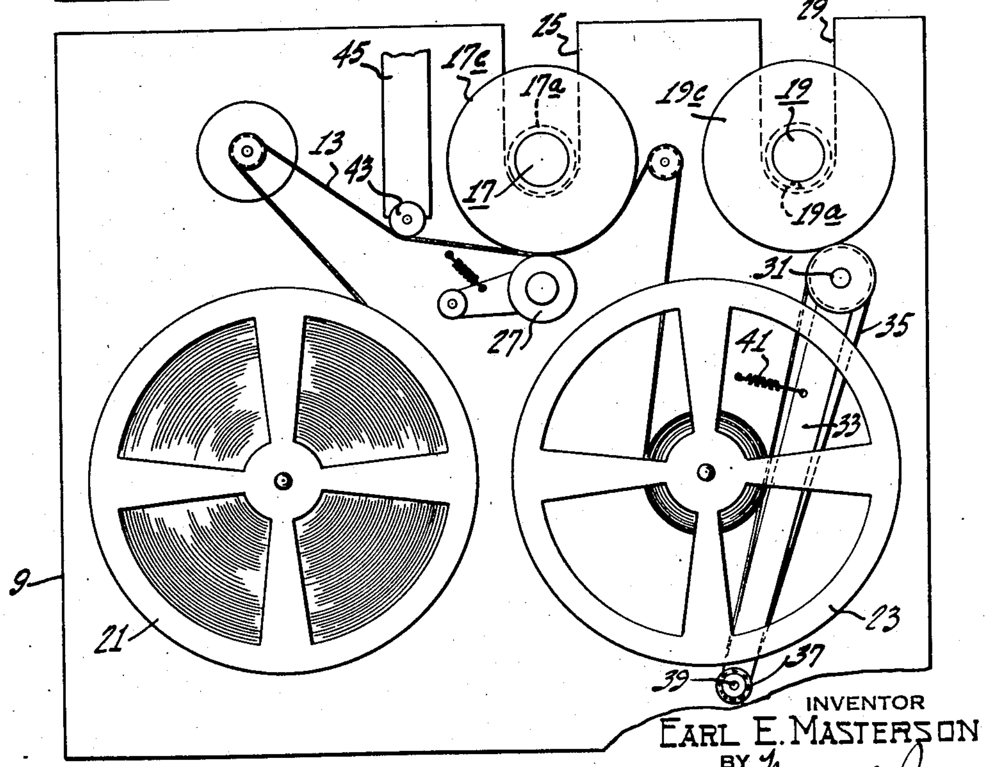
Figure 3 is a view, similar to Fig. 2, but showing one of the master-records, from which one of the dual sound-track recordings is derived, in playing position, i. e. within the machine of Fig. 1.

In Fig. 1 of the drawings there is shown a rigid structure in the form of a cabinet 1, having a "lower" compartment 3 and a wider yet shallower "upper" compartment 5. The upper compartment 5 is provided with two pairs of rearwardly extending horizontally arranged pairs of tracks 7 on the inner surface of its side walls for receiving two removable shelves, exemplified by the shelf 9 (Figs. 1 and 3), and the lower compartment 3 is provided with a multiplicity of similar pairs of tracks 7' for receiving a larger number of smaller shelves 11 (Figs. 1 and 2).

As will hereinafter more fully appear, the shelf (or shelves) 9 for the upper compartment contains all of the driven elements of a reeling system for the magnetic-master record 13 of the sound to be re-recorded upon the reelable magnetic record-blanks 15. These record-blanks 15 are wound to run on similar reeling systems contained on the shelves 11 of the lower compartment 3.

The master-record 13 will be understood to have been recorded, either in the upper compartment 5 of the machine here illustrated or in another recording machine, while that record was running at a speed several times that of the normal play-back speed of the records to be recorded on the blanks 15. In carrying the invention into effect it has been found that truly "high-fidelity" re-recordings were consistently achieved with so-called "paper-tape" records, having the (now "standard") play-back speed of seven and one-half inches per second, when the master-record from which the said recordings were derived was run at a speed of thirty inches per second during both the recording and re-recording periods. Since the practice of the method of the invention necessarily involves the use of a master-record of a length several times that of each "duplicate" it will be apparent why the "upper" compartment 5, and the shelf 9 and the reels therein are of greater dimensions than those of the corresponding "lower" parts of the machine.

As previously set forth, if the recordings to be applied to the record-blanks 15 are to be free from "wows" it is essential to maintain the reeling speed of said blanks 15 constant with respect to the speed of the master record or records 13. To this end, the cabinet 1 is provided, in accordance with the invention, with a first capstan 17 and a second capstan 19 which are common to the separate reeling systems of the master record (or records) 13 and the record blanks 15. As shown in Fig. 1, these capstans or shafts 17 and 19 extend in spaced parallel array upwardly from the base of the lower compartment 3 through the upper compartment 5 and are supported in a sufficient number of bearings 17a, 17b, 19a, 19b to maintain them against any appreciable degree of rotational distortion when they are driven by a motor, not shown (but which may be mounted beneath the base of the lower compartment 3).

The first capstan 17 serves to apply a reeling force directly to the tape-like records 13 and 15 at points or areas thereon which lie in the paths of said records between the storage reel 21 (or 21') and take-up reel 23 (or 23') of each reeling system. Since the recording method of the invention requires that the master-records 13 be driven at a faster rate than the record blanks 15, the parts 17c, 17d and 19c and 19d of the capstans 17 and 19 which drive the said records 13 and their take-up reels 21 are conveniently of a diameter larger than the capstan parts (17e and 19e, respectively) which drive the record blanks 15 and their take-up reels 23'. In order to permit the above described direct engagement of the capstan 17 with the record tapes 13 and 15 each shelf is provided at its rear with a cut-away portion or slot 25 (25') across which the record runs and within which the capstan 17 is accommodated when the shelf is moved on its tracks 7 (or 7') into the cabinet. A spring-biased pressure roller or equivalent guide element 27 (or 27') mounted on each shelf at the base of its slot serves to maintain the records 13 and record blanks 15 in frictional driven engagement with the capstan 17 when the shelves 9 and 11 are pushed all the way into their compartments.

There is a second slot 29 (29') in each shelf for accommodating the other or "second" capstan 19. Mounted adjacent to the second slot in a position to be driven by the capstan 19 is a pulley 31 (31') fixed on the free-end of a pivoted arm 33 (33') on the shelf. This pulley is provided with a belt 35 (35') which runs about another pulley 37 (37') which is mounted on or adjacent to the pivot point 39 (39') of the arm 33 (33'). A spring 41 (41') connected between the arm 33 (33') and the surface of the shelf 9 (or 11) exerts its biasing force in the direction of the take-up reel 23 (23') and serves to hold the pulley 31 (31') against the capstan 19 and the belt 35 (35') against the hub of the said reel. Thus, torque transmitted from the second capstan 19 through the pulley 31 (31') is slippingly applied to the take-up reel 23 (23') through the belt 35 (35') and drives take-up reel 23 (23') at the continuously variable speed required to prevent the building-up of any slack in that record (or record blank).

In addition to the shelf-supports 7 (7') and the capstans 17 and 19 the compartments 3 and 5 each contain at least one magnetic transducer for each record or record blank. But one magnetic transducer 43 (43') is provided for each of the two master records 13 capable of being received in the upper compartment 5. These transducers 43, 43' are "pick-up heads" and are mounted one above the other on separate brackets 45 and 45' which are affixed on the rear panel of the cabinet in a position to engage the master-tapes when the shelves 9 (or one of them) are pushed into the upper compartment 5.

Both of the pick-up heads 43 and 43' in the upper compartment 5 may be used, simultaneously, when two master records are employed as the source of the recordings to be applied to the separate sound-tracks of a dual-track record blank. In this event, one of the master records may be rewound in the reverse direction after the original recording has been applied thereto, and then run in the same direction as the other master during the re-recording interval. Thus, the sound represented by the magnetic trace on the reversely-wound master will be traced backwards on one sound track of the record blanks 15 and the sound represented by the magnetic trace on the other master record will be traced in the forward direction on the other sound track of said record-blanks 15. Consequently, the two magnetic traces on the record-blanks 15 must be played in different directions. (Such records possess the advantage of not having to be reereeled, since, upon reaching the end of the second or "counter-clockwise" recording, the record is completely wound upon its storage reel with its first or "clockwise" recording ready to be played again.)

When the record blanks 15 are of the dual-track type, at least two sound-heads are provided for each blank, i. e., one for each sound track. In the instant case four sound-heads are provided for each of the record blanks 15 in the lower compartment 3. The ones designated 47 and 47' respectively, are the "magnetic applicators" for the separate ones of the sound-tracks and hence are off-set from each other, in the vertical direction, so that they apply the magnetic traces derived from the "sound" on the separate master-records 13 to the blank records 15 along spaced apart parallel paths on opposite sides of the longitudinal axis of the said blanks. The other two sound-heads 49, 49' for each record blank are "monitoring heads" and will be understood to be connected to an acoustical transducer (not shown) through a bank of switch keys (not shown) so that the operator may observe, acoustically, and correct any imperfections in the magnetic traces on the several "blanks" 15 during the re-recording interval.

From the foregoing it will be apparent that the present invention provides an improved mass-production method of and apparatus for making reelable magnetic-phonograph records and one which lends itself readily to the duplication of both single-track and dual-track records.

What is claimed is:

1. An apparatus for simultaneously applying to a plurality of reelable, magnetizable record members a magnetic trace corresponding to the magnetic trace on the sound track of a reelable, magnetic master record member, said apparatus comprising, in combination, a mounting structure, a plurality of shelf-like supports each containing a reeling system for a separate one of said record members, each of the reeling systems comprising a storage reel, a take-up reel and a guide element mounted between said reels for engagement with the associated one of said record members, said supports being removably mounted in said structure, a capstan carried by said structure for driving all of said reeling systems, a plurality of magnetic transducers associated with separate ones of said supports for cooperation with their respective record members, and means mounting said transducers in such positions that said transducers automatically engage the corresponding record members at areas between their guide elements and one of the reels of the respective reeling systems upon the mounting of the associated shelf-like supports within said structure.

2. The invention as set forth in claim 1 and wherein two of said transducers comprise pick-up heads for a pair of master-records mounted on separate ones of said shelf-like supports and wherein two parallelly arranged transducers each connected to one of said pick-up heads are provided for each of said record-blanks, whereby to apply the sounds recorded on the separate ones of said pair of master records simultaneously in the form of separate parallelly arranged magnetic-traces to each of said record-blanks.

3. The invention as set forth in claim 1 and wherein the portion of said capstan which engages said master-record is of a diameter greater than the portions thereof which engage said record-blanks, whereby upon rotation of said capstan to drive said master-record at a speed greater than that of said record-blanks.

4. The invention as set forth in claim 1 and wherein said structure contains a second capstan from which a driving force for the take-up reels of each of said reeling systems is derived.

5. The invention as set forth in claim 4 and wherein each of said shelf-like supports carries a pulley for deriving a driving force for the take-up reel of its reeling system from said second capstan, a belt for applying the driving force on the pulley to said take-up reel, and a spring for biasing said belt into contact with said take-up reel.

EARL E. MASTERSON.

REFERENCES CITED

The following references are of record in the file of this patent:

UNITED STATES PATENTS

| Number | Name | Date |
|---|---|---|
| 1,828,190 | Kiliani | Oct. 20, 1931 |
| 1,975,929 | Eldred | Oct. 9, 1934 |
| 2,213,246 | Heller | Sept. 3, 1940 |